(12) United States Patent
Konda et al.

(10) Patent No.: US 6,469,461 B1
(45) Date of Patent: Oct. 22, 2002

(54) MOTOR CONTROL APPARATUS

(75) Inventors: Shinichi Konda, Anjo; Susumu Ueda, Okazaki, both of (JP)

(73) Assignee: Denso Corporation, Kariya (JP)

( * ) Notice: Subject to any disclaimer, the term of this patent is extended or adjusted under 35 U.S.C. 154(b) by 57 days.

(21) Appl. No.: 09/678,848

(22) Filed: Oct. 4, 2000

(30) Foreign Application Priority Data

Oct. 5, 1999 (JP) ............................................. 11-284215
Oct. 8, 1999 (JP) ............................................. 11-288396

(51) Int. Cl.[7] .......................... H02K 23/00; H02P 1/18; H02P 3/08; H02P 5/06; H02P 7/06
(52) U.S. Cl. ........................................ 318/254; 318/439
(58) Field of Search ................................. 318/131–134, 318/138, 254, 439

(56) References Cited

U.S. PATENT DOCUMENTS

| | | |
|---|---|---|
| 5,132,604 A | 7/1992 | Shimane et al. |
| 5,694,010 A | * 12/1997 | Oomura et al. ............. 318/254 |
| 6,057,664 A | * 5/2000 | Ikawa et al. ................ 318/138 |
| 6,153,993 A | * 11/2000 | Oomura et al. ............. 318/439 |

FOREIGN PATENT DOCUMENTS

| | | |
|---|---|---|
| JP | 1-209984 | 8/1989 |
| JP | 2-266891 | 10/1990 |
| JP | 3-112392 | 5/1991 |
| JP | 4-133684 | 5/1992 |
| JP | 5-219752 | 8/1993 |
| JP | 6-209581 | 7/1994 |
| JP | 7-274580 | 10/1995 |
| JP | 8-223977 | 8/1996 |
| JP | 10-234130 | 9/1998 |

* cited by examiner

Primary Examiner—Marlon T. Fletcher
(74) Attorney, Agent, or Firm—Law Offices of David G. Posz

(57) ABSTRACT

A motor control system designed to monitor a failure in a multi-phase dc motor is provided. The motor control system includes an inverter which controls an operation of the motor, a failure detecting circuit which monitors the voltage appearing at one of terminals of armature windings of the motor every active time when a PWM signal is at an active level to turn on switching elements of the inverter and determines occurrence of the failure based on the monitored voltage, and a switching operation prohibiting circuit which prohibits one of the switching elements connected to the one of the terminals of the windings of the motor from being turned on, thereby avoiding additional damages of the motor control system.

3 Claims, 7 Drawing Sheets

MOTOR CONTROL APPARATUS

BACKGROUND OF THE INVENTION

1. Technical Field of the Invention

The present invention relates generally to a motor control apparatus controlling the operation of a brushless motor through an inverter circuit, and more particularly to a motor control apparatus designed to monitor a malfunction in the apparatus.

2. Background Art

Motor control apparatus are known in the art which are designed to control the operation of a brushless motor through an inverter circuit made up of bridged power switching elements and to control the speed of the motor using PWM (Pulse-Width- Modulated) signals.

A typical motor control apparatus of the above type will be described with reference to FIGS. 6 and 7. FIGS. 6 and 7 show an example where a motor 1 includes three windings (stator coils) L1, L2, and L3 having first, second, and third phases (also referred to as U, V, and W phases below) which are connected in a delta form.

The motor control apparatus, as shown in FIG. 6, includes a switching circuit 6 that is a three-phase bridge circuit made up of positive switching elements 3p, 4p, and 5p and negative switching elements 3n, 4n, and 5n. The positive switching elements 3p to 5p are connected between a positive terminal (i.e., a higher voltage side) of a dc power supply 2 and terminals Ju, Jv, and Jw of the windings L1 to L3. Similarly, the negative switching elements 3n to 5n are connected between a negative terminal (i.e., a lower voltage side) of the power supply 2 and the terminals Ju, Jv, and Jw of the windings L1 to L3. The switching elements 3p, 4p, 5p, 3n, 4n, and 5n are each made by an N-channel MOSFET.

The motor control apparatus also includes a commutation control circuit 7 which provides drive signals Up, Un, Vp, Vn, Wp, and Wn in response to rotor position indicative signals (not shown) of the motor 1, respectively, to turn on the switching elements 3p, 3n, 4p, 4n, 5p, and 5n in a given sequence. The commutation control circuit 7 forms an inverter circuit 8 together with the switching circuit 6.

The motor control apparatus also includes a PWM signal generator 9 and AND gates 13, 14, and 15. The PWM signal generator 9 provides a PWM signal for controlling the speed of the motor 1. The AND gates 13 to 15 receive the drive signals Un, Vn, and Wn outputted from the commutation control circuit 7 and the PWM signal outputted from the PWM signal generator 9.

The drive signals Up, Vp, and Wp produced by the commutation control circuit 7 are inputted to gates of the switching elements 3p, 4p, and 5p, respectively. Outputs of the AND gates 13, 14, and 15 are inputted to gates of the switching elements 3n, 4n, and 4n, respectively.

Each of the switching elements 3p, 4p, and 5p is turned on when a corresponding one of the drive signals Up, Vp, and Wp is at a higher level, while each of the switching elements 3n, 4n, and 5n is turned on when a logical product of the PWM signal from the PWM signal generator 9 and a corresponding one of the drive signals Un, Vn, and Wn is at the higher level (see FIG. 7).

The commutation control circuit 7 switches, as shown in FIG. 7, the drive signals Up, Un, Vp, Vn, Wp, and Wn between the high level and the low level in a cycle to rotate the motor 1. In FIG. 7, each of the drive signals Un, Vn, and Wn to be inputted to the switching elements 3n, 4n, and 5n lying in level on a lower side, as viewed in the drawing, shows the high level. The same is true for FIG. 2, as referred to later.

The positive switching element 3p and the negative switching element 3n connected to the U-phase winding terminal Ju are each turned on for a time period equivalent to an electric angle of 120°, and become active alternately at a time interval of 60° away from each other. The positive switching element 4p and the negative switching element 4n connected to the V-phase winding terminal Jv and the positive switching element 5p and the negative switching element 5n connected to the W-phase winding terminal Jw become active at a phase interval of 120° away from the positive switching element 3p and the negative switching element 3n. Specifically, during a time when the positive and negative switching elements connected to one of the phase winding terminals Ju, Jv, and Jw are both turned off (i.e., an electric angular interval of 60°), another one of the positive switching elements connected to the second one of the phase winding terminals Ju, Jv, and Jw is turned on, while one of the negative switching elements connected to the third one of the phase winding terminals Ju, Jv, and Jw is turned on according to the PWM signal.

FIGS. 6 and 7 illustrate for the case where the negative switching elements 3n, 4n, and 5n are PWM-controlled when the drive signals Un, Vn, and Wn are at the high level, but the positive switching elements 3p, 4p, and 5p, or all the positive and negative switching elements 3n, 4n, 5n, 3p, 4p, and 5p may be PWM-controlled.

If a malfunction occurs in one of the switching elements of the inverter circuit 8 due to a short, turning on of the malfunctioning switching element and a mating one of the switching elements causes an excess current to flow through them. For example, in a case where the U-phase negative switching element 3n is short-circuited, when the U-phase positive switching element 3p is turned on, it will cause an excess current to flow through both the switching elements 3n and 3p.

In order to detect such a malfunction, the motor control apparatus shown in FIG. 6 has a current detecting shunt resistor 16 disposed between sources of the negative switching elements 3n, 4n, and 4n and the minus (−) terminal of the dc power supply 2 to monitor the potential difference between terminals of the shunt resistor 16. When the potential difference becomes greater than a given value, the motor control apparatus determines that any one of the switching elements has been short-circuited and forces all the switching elements into an off-state (as taught in Japanese Patent First Publication Nos. 6-209581 and 7-274580.

Such a system, however, detects occurrence of a malfunction of a switching element after a mating switching element is turned on so that the current flows through the malfunctioning switching element and the mating switching element and has the disadvantage that the current flow may result in a malfunction of the mating switching element that is normally operating. The system has the further disadvantage that the current flows through the shunt resistor 16 even when the system is normally operating, thereby resulting in loss of electric energy.

Japanese Patent First Publication No. 2-266891 teaches a system which determines that a malfunction has occurred when the voltage appearing at winding terminals of a motor does not change cyclically during an operation of the motor and disables all switching elements. The system, however, has also the disadvantages that it is impossible to detect occurrence of the malfunction before the current flows through the switching elements and the current flow may lead to an additional malfunction.

The above Japanese Patent First Publication No. 7-274580 is also designed to compare the voltage at each of the winding terminals Ju, Jv, and Jw with a reference voltage immediately after switching of a corresponding one of the drive signals Up to Wn, determine that a malfunction has occurred when a result of the comparison does not match up with the one of the drive signals Up to Wn, and disables all the switching elements 3p to 5n. This system, however, the disadvantage that in a case where any one of the switching elements is short-circuited during a time from detection of the malfunction (i.e., the preceding commutation) to the subsequent commutation, a mating one of the switching elements may be short-circuited when turned on. For example, if the U-phase negative switching element 3n is short-circuited during a time from when the drive signal Un, as shown in FIG. 7, changes from high to low level to when the drive signal Up changes from low to high level, the U-phase positive switching element 3p is turned on at the time of the next commutation before the system detects the short circuit of the switching element 3n, which may cause the switching element 3p to be also short-circuited.

The system, as taught in Japanese Patent First Publication No. 7-274580, operates each of the switching elements 3p to 5n when a corresponding one of the drive signals Up to Wn is at high or low level, so that the voltages Vu, Vv, and Vw at the winding terminals Ju, Jv, and Jw depend upon the level of the drive signals Up to Wn. However, since either or both of a set of the positive switching elements 3p to 5p and a set of the negative switching elements 3n to 5n are PWM-controlled, the on-off operations of the switching elements 3p to 5n are not always synchronous with the drive signals Up to Wn, which will result in a difficulty in detecting a failure of the switching elements 3p to 5n accurately at all times.

SUMMARY OF THE INVENTION

It is therefore a principal object of the present invention to avoid the disadvantages of the prior art.

It is another object of the present invention to provide a motor control apparatus which is capable of minimizing the damage of the apparatus when a failure occurs in the apparatus.

According to one aspect of the invention, there is provided a motor control apparatus which comprises: (a) an inverter circuit including a switching circuit and a commutation control circuit, the switching circuit including a first set of switching elements each of which is connected at one end to a higher voltage side of a dc power supply and at the other end to one of terminals of windings of a multi-phase motor and a second set of switching elements each of which is connected at one end to a lower voltage side of the dc power supply and at the other end to one of the terminals of the windings of the multi-phase motor, the commutation control circuit producing drive signals to turn on the switching elements in sequence for rotating the motor; (b) a PWM signal generator generating PWM (Pulse-Width-Modulated) signals which turn on at least one of the first and second sets of the switching elements cyclically for controlling the speed of the motor; (c) a switching element failure detecting circuit determining whether a voltage appearing at one of the terminals of the windings of the motor is lower than a given reference voltage or not every active time when the PWM signal is at an active level to turn on the switching elements, when the voltage is lower than the given reference voltage, the switching element failure detecting circuit determining that one of the second set of the switching elements connected to the one of the terminals of the windings has failed and outputting a switching element failure indicative signal; and (d) a switching operation prohibiting circuit responsive to the switching element failure indicative signal outputted from the switching element failure detecting circuit to prohibit one of the first set of the switching elements connected to the one of the terminals of the windings of the motor from being turned on.

In the preferred mode of the invention, the switching element failure detecting circuit includes a comparator and a latch circuit. The comparator compares the voltage appearing at the one of the terminals of the windings of the motor with the given reference voltage to provide an output signal at one of a high and a low level when the voltage is lower than the given reference voltage. The latch circuit includes a gate terminal to which the PWM signal is inputted, a data terminal to which an output signal of the comparator is inputted, and an output terminal which outputs the output signal of the comparator as it is when the PWM signal is at the active level and outputs the output signal of the comparator latched at a time when the PWM signal has changed from the active level to a passive level turning off the switching elements when the PWM signal is at the passive level. The switching operation prohibiting circuit prohibits the one of the first set of the switching elements from being turned on when a signal outputted from the output terminal of the latch circuit is at the one of the high and low level of the output signal of the comparator.

A second switching element failure detecting circuit is further provided which determines whether a voltage appearing at one of the terminals of the windings of the motor is higher than a given reference voltage or not every active time, determines that one of the first set of the switching elements connected to the one of the terminals of the windings has failed to output a second switching element failure indicative signal when the voltage is higher than the given reference voltage. A second switching operation prohibiting circuit is provided which is responsive to the second switching element failure indicative signal to prohibit one of the second set of the switching elements connected to the one of the terminals of the windings of the motor from being turned on.

A failure indicative signal generator may also be provided which generates a failure indicative signal when either or both of the switching element failure detecting circuit and the second switching element failure detecting circuit determine that failure has occurred in the switching element for prohibiting all the switching elements from being turned on.

According to the second aspect of the invention, there is provided a motor control apparatus which comprises: (a) an inverter circuit including a switching circuit and a commutation control circuit, the switching circuit including a first set of switching elements each of which is connected at one end to a higher voltage side of a dc power supply and at the other end to one of terminals of windings of a multi-phase motor and a second set of switching elements each of which is connected at one end to a lower voltage side of the dc power supply and at the other end to one of the terminals of the windings of the multi-phase motor, the commutation control circuit producing drive signals to turn on the switching elements in sequence for rotating the motor; (b) a PWM signal generator generating PWM (Pulse-Width-Modulated) signals which turn on at least one of the first and second sets of the switching elements cyclically for controlling the speed of the motor; (c) a switching element failure detecting circuit determining whether a voltage appearing at one of the terminals of the windings of the motor is higher than a given reference voltage or not every active time when the PWM signal is at an active level to turn on one of the switching elements, when the voltage is higher than the given reference voltage, the switching element failure detecting circuit determining that one of the first set of the switching elements connected to the one of the terminals of the windings has failed and outputting a switching element failure indicative signal; and (d) a switching operation prohibiting circuit responsive to the switching element failure indicative signal outputted from the failure detecting circuit to prohibit one of the second set of the switching elements connected to the one of the terminals of the windings of the motor from being turned on.

In the preferred mode of the invention, the switching element failure detecting circuit includes a comparator and a latch circuit. The comparator compares the voltage appearing at the one of the terminals of the windings of the motor with the given reference voltage to provide an output signal at one of a high and a low level when the voltage is lower than the given reference voltage. The latch circuit includes a gate terminal to which the PWM signal is inputted, a data terminal to which an output signal of the comparator is inputted, and an output terminal which outputs the output signal of the comparator as it is when the PWM signal is at the active level and outputs the output signal of the comparator latched at a time when the PWM signal has changed from the active level to a passive level turning off the switching elements when the PWM signal is at the passive level. The switching operation prohibiting circuit prohibits the one of the first set of the switching elements from being turned on when a signal outputted from the output terminal of the latch circuit is at the one of the high and low level of the output signal of the comparator.

A second switching element failure detecting circuit is provided which determines whether a voltage appearing at one of the terminals of the windings of the motor is lower than a given reference voltage or not every active time and determines that one of the second set of the switching elements connected to the one of the terminals of the windings has failed to output a second switching element failure indicative signal when the voltage is lower than the given reference voltage. A second switching operation prohibiting circuit is provided which is responsive to the second switching element failure indicative signal to prohibit one of the first set of the switching elements connected to the one of the terminals of the windings of the motor from being turned on.

A failure indicative signal generator may also be provided which generates a failure indicative signal when either of both of the switching element failure detecting circuit and the second switching element failure detecting circuit determine that failure has occurred in the switching element for prohibiting all the switching elements from being turned on.

According to the third aspect of the invention, there is provided a motor control apparatus which comprises: (a) an inverter circuit including a switching circuit and a commutation control circuit, the switching circuit including a first set of switching elements each of which is connected at one end to a higher voltage side of a dc power supply and at the other end to one of terminals of windings of a multi-phase motor and a second set of switching elements each of which is connected at one end to a lower voltage side of the dc power supply and at the other end to one of the terminals of the windings of the multi-phase motor, the commutation control circuit producing drive signals to turn on the switching elements in sequence for rotating the motor; (b) a PWM signal generator generating PWM (Pulse-Width-Modulated) signals which turn on at least one of the first and second sets of the switching elements cyclically for controlling the speed of the motor; and (c) a failure detecting circuit monitoring a voltage appearing at one of the terminals of the windings of the motor every active time when the PWM signal is at an active level to turn on one of the switching elements, the failure detecting circuit checking the voltage monitored when the PWM signal, provided to either of one of the first set of the switching elements connected to the one of the terminals and one of the second set of the switching element connected to the one of the terminals, is at the active level to detect a failure in the other switching element.

According to the fourth aspect of the invention, there is provided an apparatus for detecting a motor current flowing through delta-connected armature windings of a three-phase brushless dc motor when the motor is operated through a motor driver. The apparatus comprises: (a) a neutral voltage detecting circuit including three resistors which are connected at one end to the armature windings of the motor, respectively, and at the other end to a common junction, the neutral voltage detecting circuit measuring a voltage developed at the common junction as a neutral voltage V1 of the motor; (b) a speed proportional voltage generator generating a voltage V2 proportional to a speed N of the motor according to an equation (1) below; and (c) a current determining circuit determining a voltage Vo according to an equation (2) below which indicates the motor current flowing through the motor.

$$V2 = A \cdot N \tag{1}$$

where A is a constant of proportion which is given by a relation of $A = k \cdot \phi / 2$ where k is a constant of electromotive force and $\phi$ is magnetic flux over one of the armature windings.

$$Vo = VB - V1 - V2 \tag{2}$$

where VB is a voltage supplied to the motor driver to operate the motor.

In the preferred mode of the invention, an operation suspending circuit is provided which suspends the operation of the motor for a preselected period of time when the voltage Vo exceeds a given threshold value.

The operation suspending circuit may stop the operation of the motor completely when the number of times the operation of the motor is suspended reaches a preselected number.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
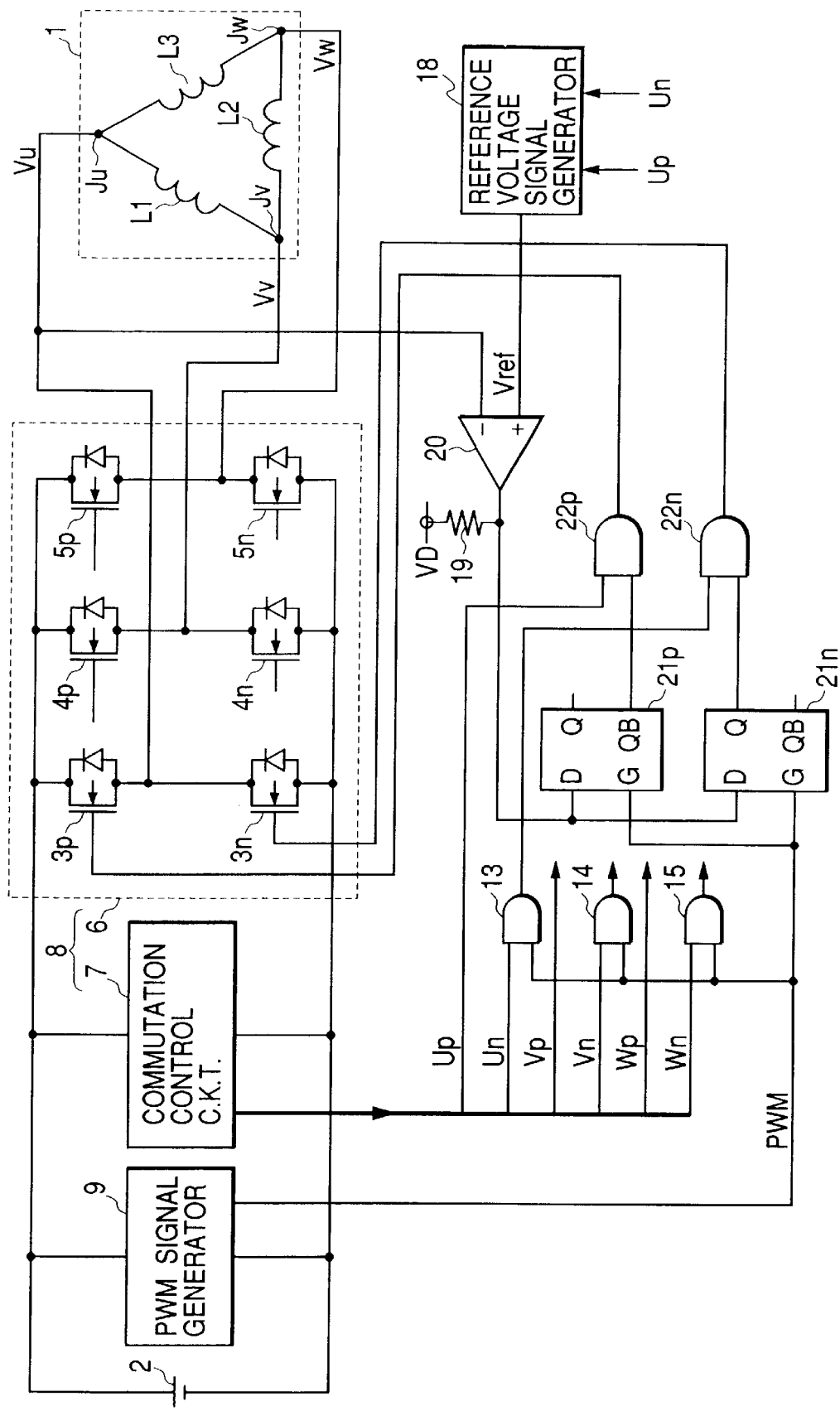
FIG. 1 is a block diagram which shows a motor control apparatus according to the first embodiment of the invention.
Figure 6:
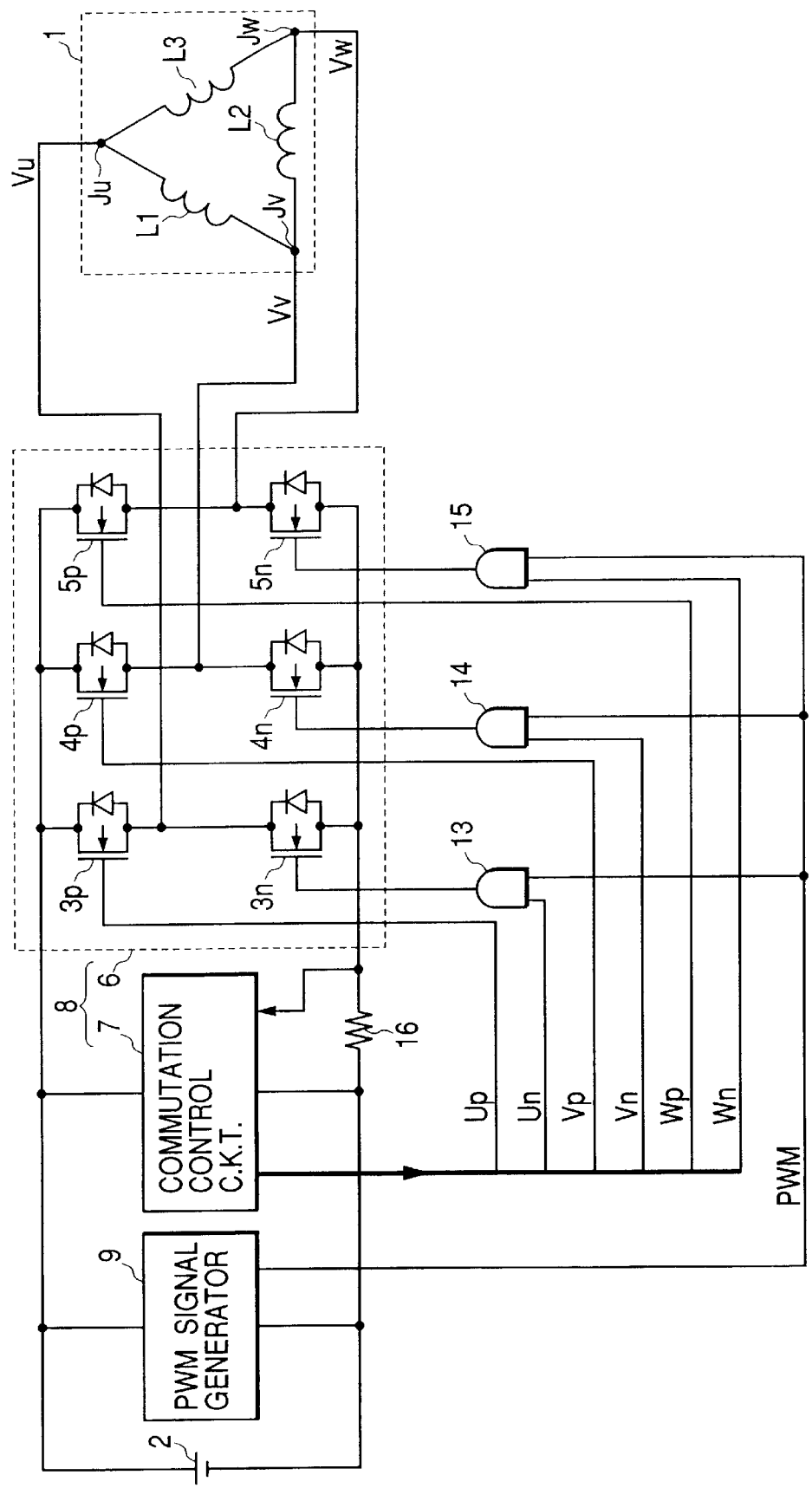
FIG. 6 is a block diagram which shows a conventional motor control apparatus.
Figure 7:
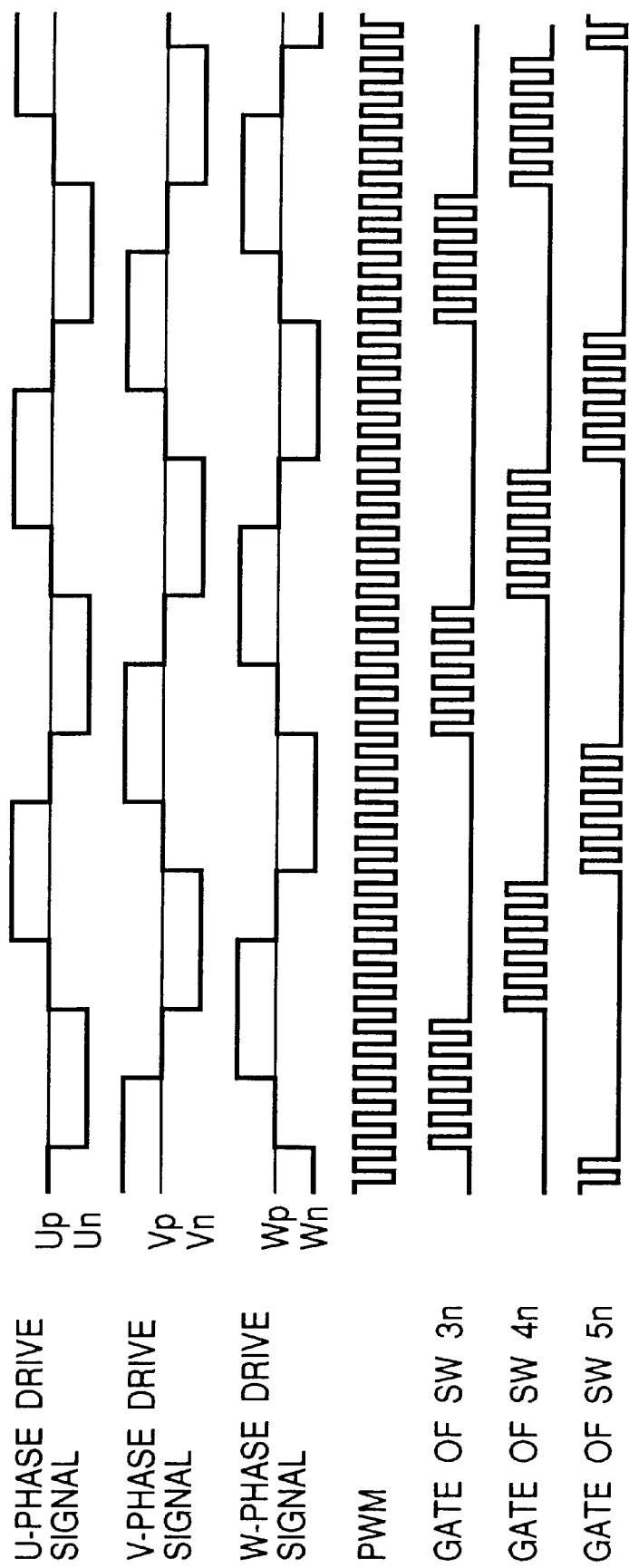
FIG. 7 is a time chart which shows an operation of a motor to be controlled by the motor control apparatus in FIG. 6.

Referring now to the drawings, wherein like numbers refer to like parts in several views, particularly to FIG. 1, there is shown a motor control apparatus according to the first embodiment of the invention. The same reference numbers and symbols as employed in FIG. 6 refer to the same parts, and explanation thereof in detail will be omitted here.

The motor control apparatus includes a comparator 20 and latch circuits 21p and 21n. The comparator 20 is connected at an inverting input (−terminal) to the winding terminal Ju of the motor 1 (e.g., a dc brushless motor) at which the voltage Vu appears and at a non-inverting input (+terminal) to an output terminal of the reference voltage generator 18 at which the reference voltage Vref is developed. The comparator 20 has also an output pulled up to the source voltage VD through a resistor 19. Each of the latch circuits 21p and 21n has the gate terminal, as labeled G, to which a PWM (Pulse-Width-Modulated) signal is inputted from the PWM signal generator 9 and the data terminal, as labeled D, to which an output of the comparator 20 is inputted. When the PWM signal is active or at a high level, each of the latch circuits 2p and 2n outputs the output signal of the comparator 20 as it is from the output terminal, as labeled Q. Alternatively, when the PWM signal is passive or at a low level, each of the latch circuits 21p and 2n outputs from the Q output terminal the output signal of the comparator 20 latched at the instant the PWM signal changed from high to low level. Each of the latch circuits 21p and 21n is designed to output a signal from an inverting output terminal, as labeled QB, which is reverse in level to a signal outputted from the Q output terminal.

Figure 2:
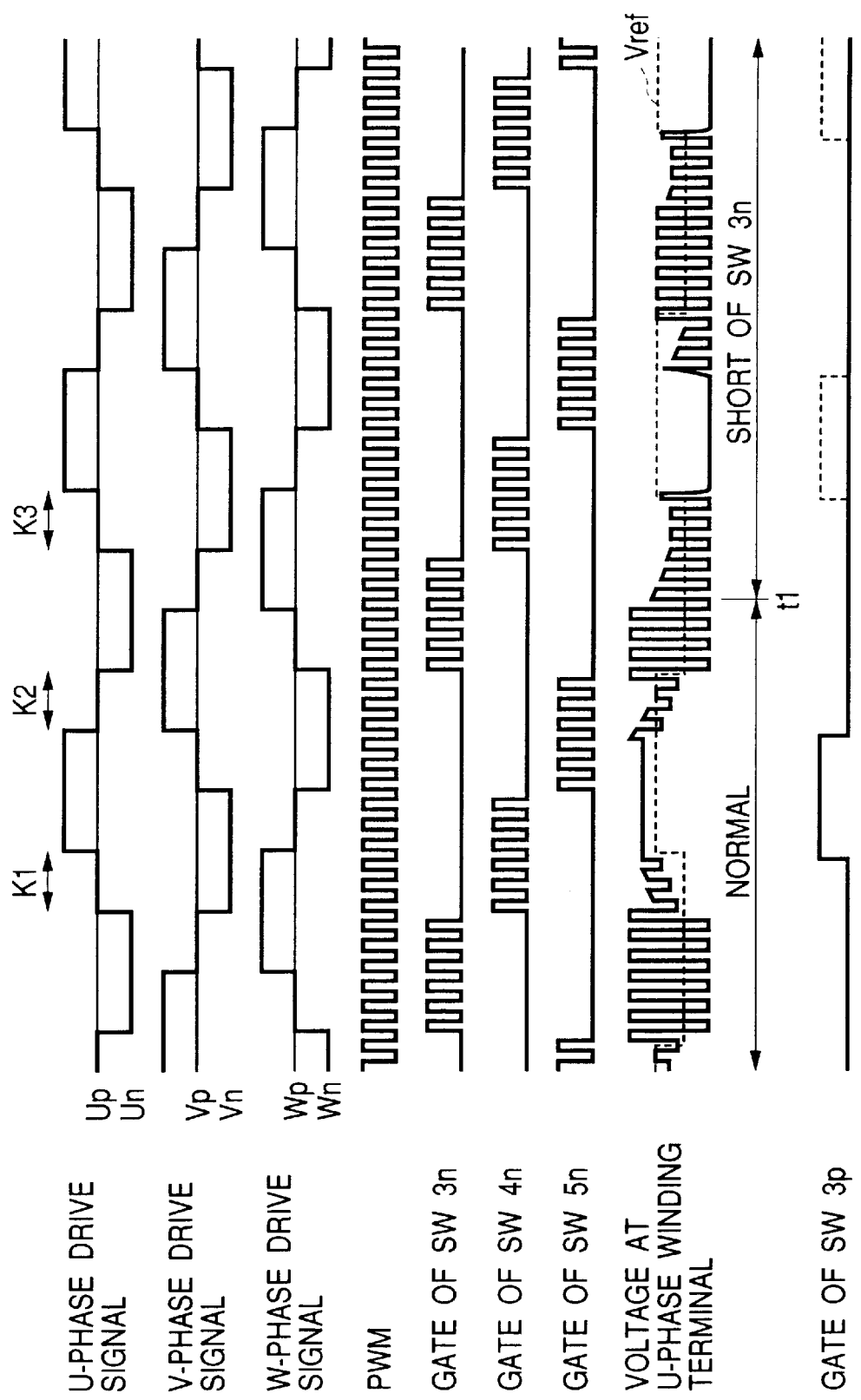
FIG. 2 is a time chart which shows an operation of a motor to be controlled by the motor control apparatus in FIG. 1.

The reference voltage generator 18 outputs, as indicated by a broken line illustrated in FIG. 2 together with the U-phase winding terminal voltage Vu, the reference voltage Vref which is slightly higher than half an output voltage of the dc power supply 2 (three quarters (¾) of the output voltage of the dc power supply in this embodiment) during a time from when the drive signal Up provided from the commutation control circuit 7 to the U-phase positive switching element 3p changes to a high level to when the drive signal Un provided to the U-phase negative switching element 3n changes to the high level and which is slightly lower than half the output voltage of the dc power supply 2 (a quarter (¼) of the output voltage of the dc power supply 2 in this embodiment) during a time from when the drive signal Un changes to the high level to when the drive signal Up changes to the high level.

The motor control apparatus also includes AND gates 22p and 22n. The AND gate 22p outputs a logical product of the drive signal Up outputted from the commutation control circuit 7 and a signal outputted from the QB output terminal of the latch circuit 2 1p to a gate of the U-phase positive switching element 3p. Similarly, the AND gate 22n outputs a logical product of an output of the AND gate 13 (i.e., a logical product of the drive signal Un outputted from the commutation control circuit 7 and the PWM signal outputted-from the PWM signal generator 9) and a signal outputted from the Q output terminal of the latch circuit 21n to a gate of the U-phase negative switching element 3n.

FIG. 1 shows only the circuit structure provided for the U-phase winding terminal Ju of the motor 1 for the brevity of illustration, but the same circuit structure (i.e., the reference voltage generator 18, the resistor 19, the comparator 20, the latch circuits 21p and 21n, and the AND gates 22p and 22n) is, in practice, provided for each of the V-phase winding terminal Jv and the W-phase winding terminal Jw.

Specifically, in the circuit provided for the V-phase winding terminal Jv consisting of the reference voltage generator 18, the resistor 19, the comparator 20, the latch circuits 21p and 21n, and the AND gates 22p and 22n, the voltage Vv appearing at the V-phase winding terminal Jv is inputted to the inverting input of the comparator 20. The reference voltage generator 18 works to output the reference voltage Vref which is slightly higher than half the output voltage of the dc power supply 2 (three quarters (¾) of the output voltage of the dc power supply in this embodiment) during a time from when the drive signal Vp provided from the commutation control circuit 7 to the V-phase positive switching element 4p changes to the high level to when the drive signal Vn provided to the V-phase negative switching element 4n changes to the high level and which is slightly lower than half the output voltage of the dc power supply 2 (a quarter (¼) of the output voltage of the dc power supply 2 in this embodiment) during a time from when the drive signal Vn changes to the high level to when the drive signal Vp changes to the high level. The AND gate 22p outputs a logical product of the drive signal Vp outputted from the commutation control circuit 7 and a signal outputted from the QB output terminal of the latch circuit 21p to a gate of the V-phase positive switching element 4p. The AND gate 22n outputs a logical product of an output of the AND gate 14 (i.e., a logical product of the drive signal Vn outputted from the commutation control circuit 7 and the PWM signal outputted from the PWM signal generator 9) and a signal outputted from the Q output terminal of the latch circuit 2 In to a gate of the V-phase negative switching element 4n.

Similarly, in the circuit provided for the W-phase winding terminal Jw consisting of the reference voltage generator 18, the resistor 19, the comparator 20, the latch circuits 21p and 2 In, and the AND gates 22p and 22n, the voltage Vw appearing at the W-phase winding terminal Jw is inputted to the inverting input of the comparator 20. The reference voltage generator 18 works to output the reference voltage Vref which is slightly higher than half the output voltage of the dc power supply 2 (three quarters (¾) of the output voltage of the dc power supply in this embodiment) during a time from when the drive signal Wp provided from the commutation control circuit 7 to the W-phase positive switching element 5p changes to the high level to when the drive signal Wn provided to the W-phase negative switching element 5n changes to the high level and which is slightly lower than half the output voltage of the dc power supply 2 (a quarter (¼) of the output voltage of the dc power supply 2 in this embodiment) during a time from when the drive signal Wn changes to the high level to when the drive signal Wp changes to the high level. The AND gate 22p outputs a logical product of the drive signal Wp outputted from the commutation control circuit 7 and a signal outputted from the QB output terminal of the latch circuit 21p to a gate of the W-phase positive switching element 5p. The AND gate 22n outputs a logical product of an output of the AND gate 15 (i.e., a logical product of the drive signal Wn outputted from the commutation control circuit 7 and the PWM signal outputted from the PWM signal generator 9) and a signal outputted from the Q output terminal of the latch circuit 21n to a gate of the W-phase negative switching element 5n.

The operation of the motor control apparatus will be discussed below with reference to, as an example, the circuit provided for the U-phase winding terminal Ju.

The comparator 20 compares the voltage Vu developed at the U-phase winding terminal Ju in level with the reference voltage Vref inputted from the reference voltage generator 18 and outputs a high level signal when the voltage Vu is lower than the reference voltage Vref.

The latch circuit 21p outputs from the Q output terminal the output of the comparator 20 as it is when the PWM signal is high, while it outputs the output of the comparator 20 latched at the instant the PWM signal changed from high to low level when the PWM signal is low. The latch circuit 21p always outputs from the QB output terminal to the AND gate 22p a signal reverse in level to that from the Q output terminal.

When the latch circuit 21p outputs the low level signal from the output terminal, that is, when the high level signal is outputted from the QB output terminal, the AND gate 22p applies the drive signal Up produced by the commutation control circuit 7 to the gate of the U-phase positive switching element 3p. Alternatively, when the latch circuit 21p outputs the high level signal from the Q output terminal, that is, when the low level signal is outputted from the QB output terminal, the output of the AND gate 22p is kept low, so that the gate of the U-phase positive switching element 3p is kept low regardless of the drive signal Up from the commutation control circuit 7, thereby prohibiting the positive switching element 3p from being turned on.

Specifically, the motor control apparatus determines through the comparator 20 and the latch circuit 21p whether the voltage Vu appearing at the U-phase winding terminal Ju is lower than the reference voltage Vref or not when the PWM signal is at the high level every cycle of the PWM signal. If it is determined that the voltage Vu is lower than the reference voltage Vref, that is, when the low level signal is outputted from the QB output terminal of the latch circuit 21p, the AND gate 22p works to prohibit the U-phase positive switching element 3p from being turned on.

The comparator 20 outputs the low level signal when the voltage Vu at the U-phase winding terminal Ju is higher than the reference voltage Vref. The latch circuit 21n outputs, like the latch circuit 21p, the output of the comparator 20 from the Q output terminal as it is when the PWM signal is at the high level and, when the PWM signal is at the low level, the output of the comparator 20 latched at the instant when the PWM signal changed from high to low level.

When the high level signal is outputted from the Q output terminal of the latch circuit 21n, the AND gate 22n provides a logical product of the drive signal Un and the PWM signal (i.e., the output of the AND gate 13) to the gate of the U-phase negative switching element 3n. Alternatively, when the low level signal is outputted from the Q output terminal of the latch circuit 21n, the output of the AND gate 22n is kept low, so that the gate of the U-phase negative switching element 3n is kept low regardless of the drive signal Un from the commutation control circuit 7, thereby prohibiting the negative switching element 3n from being turned on.

Specifically, the motor control apparatus determines through the comparator 20 and the latch circuit 21n whether the voltage Vu appearing at the U-phase winding terminal Ju is higher than the reference voltage Vref or not when the PWM signal is at the high level every cycle of the PWM signal. If it is determined that the voltage Vu is higher than the reference voltage Vref, that is, when the low level signal is outputted from the QB output terminal of the latch circuit 21n, the AND gate 22n works to prohibit the U-phase negative switching element 3n from being turned on.

When all the switching elements 3p to 5n of the switching circuit 6 are, as shown in FIG. 2 before time to, normally operating, the W-phase positive switching element 5p is turned on in response to the drive signal Wp, and the V-phase negative switching element 4n is turned on in response to a logical product of the drive signal Vn and the PWM signal in an off-time K1, for example, during which the drive signals Up and Un are both at the low level and just before the positive switching element 3p is turned on. In an off-time K2, for example, during which the drive signals Up and Un are both at the low level and just before the negative switching element 3n is turned on, the V-phase positive switching element 4p is turned on in response to the drive signal Vp, and the W-phase negative switching element 5n is turned on in response to a logical product of the drive signal Wn and the PWM signal.

Thus, when the PWM signal is high in the off-time K1, the voltage Vu developed at the U-phase winding terminal Ju is about half the output voltage of the dc power supply 2 (which is higher than the reference voltage Vref), so that the comparator 20 outputs the low level signal, and the latch circuit 21p outputs the high level signal from the QB output terminal. This causes the U-phase positive switching element 3p to be turned on through the AND gate 22p upon change of the drive signal Up to the high level. In the off-time K1 and an on-time during which the positive switching element 3p is turned on (i.e., when the drive signal Up is at the high level), the latch circuit 21n outputs the low level signal from the Q output terminal, but these time periods are not a time period in which the U-phase negative switching element 3n is to be turned on, thus not affecting the operation of the switching circuit 6.

When the PWM signal is high in the off-time K2, the voltage Vu developed at the U-phase winding terminal Ju is about half the output voltage of the dc power supply 2 (which is lower than the reference voltage Vref), so that the comparator 20 outputs the high level signal, and the latch circuit 21n outputs the high level signal from the Q output terminal. This causes the U-phase negative switching element 3n to be turned on through the AND gate 22n upon change of the drive signal Un to the high level. In the off-time K2 and an on-time during which the negative switching element 3n is turned on (i.e., when the drive signal Un is at the high level), the latch circuit 21p outputs the low level signal from the QB output terminal, but these time periods are not a time period in which the U-phase positive switching element 3p is to be turned on, thus not affecting the operation of the switching circuit 6.

If the U-phase negative switching element 3n is short-circuited at the time t1 in FIG. 2, it will cause the voltage Vu at the U-phase winding terminal Ju to be decreased below a normal level. In an off-time K3 just before the positive switching element 3p is turned on, the voltage Vu drops below the reference voltage Vref each time the PWM signal becomes high, so that the comparator 20 outputs the high level signal, and the latch circuit 21p outputs the low level signal from the QB output terminal. Note that the right portion of FIG. 2 after the time t1 illustrates for the case where the negative switching element 3n is not short-circuited perfectly, but undergoing the so-called rare-short in which the negative switching element 3n operates normally, but the voltage Vu is decreased).

When the low level signal is outputted from the latch circuit 21p, the gate of the U-phase positive switching element 3p is, as shown in FIG. 2, kept low by the AND gate 22p even if the drive signal Up outputted from the commutation control circuit 7 changes to the high level, thereby prohibiting the positive switching element 3p from being turned on. This causes the motor 1 to be decreased in speed gradually to zero, so that the commutation control circuit 7 stops producing the drive signals Up to Wn.

FIG. 2 illustrates for the case where the negative switching element 3n is short-circuited in an on-time thereof, but the positive switching element 3p is also prohibited from being turned on when the negative switching element 3n is short-circuited immediately before the drive signal Up changes from low to high level.

Specifically, if the negative switching element 3n is short-circuited before the on-time of the positive switching element 3p, the motor control apparatus detects such a malfunction reliably and holds the positive switching element 3p off even when the on-time there is reached. The motor control apparatus of this embodiment, therefore, prevents the current from flowing through the short-circuited negative switching element 3n and the positive switching element 3p companion to the negative switching element 3n when they are turned on, thereby avoiding a malfunction of the switching element 3p due to the short circuit of the negative switching element 3n. The same is true for the V-phase switching elements 4p and 4n and the W-phase switching elements 5p and 5n.

If, although not illustrated in FIG. 2, the U-phase positive switching element 3p is short-circuited, it will cause the voltage Vu at the U-phase winding terminal Ju to be increased above the normal level. In an off-time just before the negative switching element 3n is turned on, the voltage Vu rises above the reference voltage Vref each time the PWM signal becomes high, so that the comparator 20 outputs the low level signal, and the latch circuit 2 In outputs the low level signal from the Q output terminal. When the low level signal is outputted from the latch circuit 2 in, it will cause the gate of the U-phase negative switching element 3n is kept low by the AND gate 22n even if the drive signal Un outputted from the commutation control circuit 7 changes to the high level, thereby prohibiting the negative switching element 3n from being turned on. The prohibition of turning on of the negative switching element 3n is also achieved when it is short-circuited immediately before the drive signal Un changes from low to high level.

The motor control apparatus of this embodiment, therefore, prevents the current from flowing through the short-circuited positive switching element 3p and the negative switching element 3n companion to the positive switching element 3p when they are turned on, thereby avoiding a malfunction of the switching element 3n due to the short circuit of the switching element 3p. The same is true for the V-phase switching elements 4p and 4n and the W-phase switching elements 5p and 5n.

While this embodiment uses the single comparator 20 for the latch circuits 21p and 21n and changes the reference voltage Vref to be inputted to the comparator 20 using the reference voltage generator 18, two comparator may be provided one for each of the latch circuits 21p and 21n, and reference voltages may be inputted to the comparators, respectively.

The AND gate 22n may be implemented by a three-input AND gate into which the PWM signal from the PWM signal generator 9 and the drive signals from the commutation control circuit 9 are inputted, thereby eliminating the need for the AND gates 13 to 15.

The two latch circuits 21p and 21n are provided for each of the winding terminals Ju, Jv, and Jw, but one of the latch circuits 21p and 21n, for example, the latch circuit 21p may be connected at the Q output terminal to the AND gate 22n, which eliminates the use of the latch circuit 21n.

Figure 3:
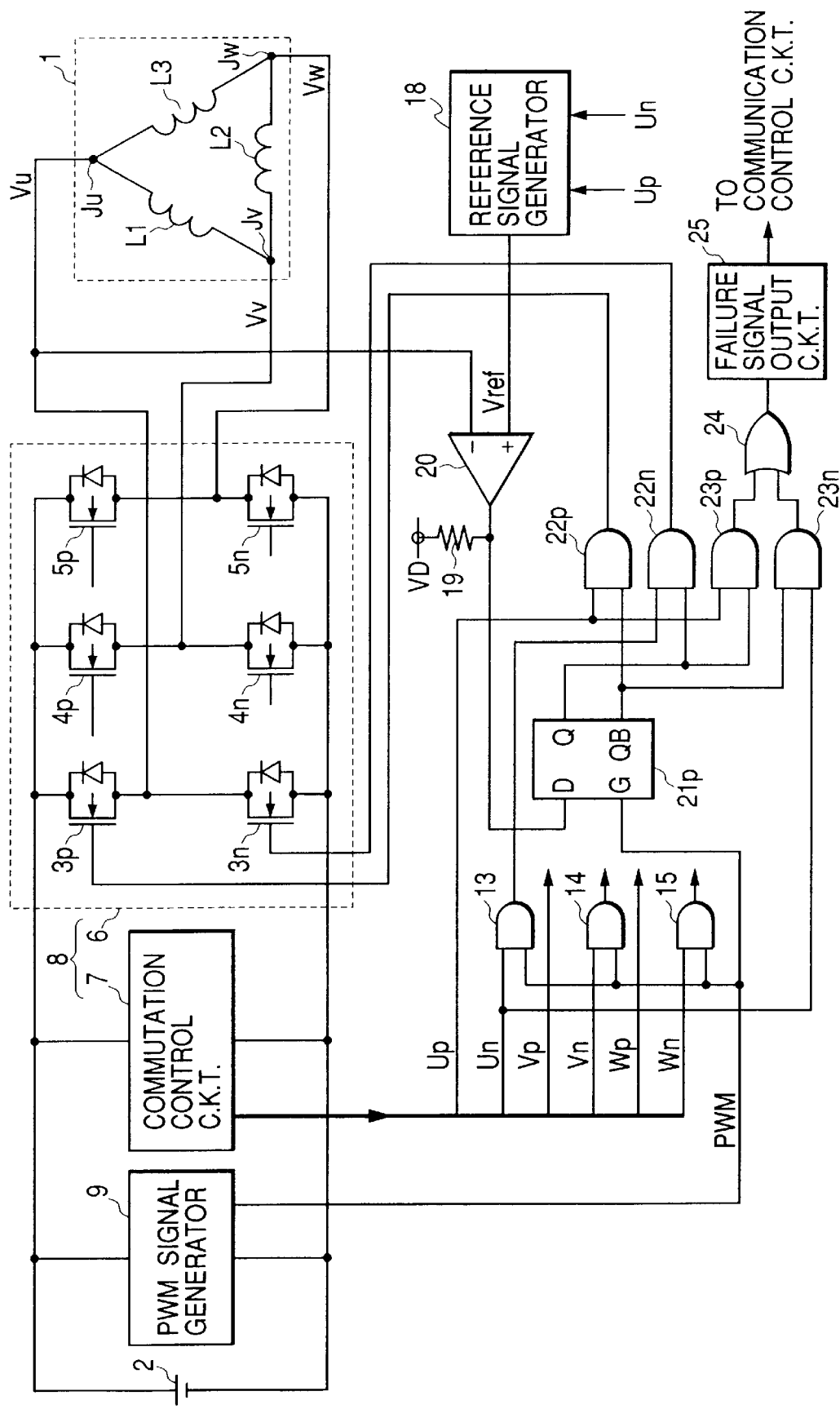
FIG. 3 is a block diagram which shows a motor control apparatus according to the second embodiment of the invention.

FIG. 3 shows a motor control apparatus according to the second embodiment of the invention. The same reference numbers and symbols as employed in the first embodiment refer to the same parts, and explanation thereof in detail will be omitted here.

The motor control apparatus of this embodiment is different from the one shown in FIG. 1 in two points below.
(1) The latch circuit 2in is omitted. The latch circuit 21p is connected at the Q output terminal to the AND gate 22n. The QB inverting output terminal of the latch circuit 21p is, like the first embodiment, connected to the AND gate 22p.
(2) The motor control apparatus also includes AND gates 23p and 23n, an OR gate 24, and a failure-detected signal output circuit 25. The AND gate 23p outputs a logical product of the drive signal Up outputted from the commutation control circuit 7 and a signal outputted from the Q output terminal of the latch circuit 21p. The AND gate 23n outputs a logical product of the drive signal Up and a signal outputted from the QB inverting output signal of the latch circuit 21p. The OR gate 24 outputs a logical sum of the output signal of the AND gate 23p and the output signal of the AND gate 23n. The failure indicative signal output circuit 25 latches the high level signal outputted from the OR gate 24 and outputs it as a failure indicative signal to the commutation control circuit 7.

The commutation control circuit 7 is responsive to the failure indicative signal outputted from the failure indicative signal output circuit 25 to bring all the drive signals Up to Wn into low level.

FIG. 3 shows only the circuit structure associated with the U-phase winding terminal Ju of the motor 1 and the drive signals Up and Un for the brevity of illustration, but, in practice, the same circuit structure (including the AND gates 23p and 23n and the OR gate 24) is, like the first embodiment, provided for each of the V-phase winding terminal Jv (the drive signals Vp and Vn) and the W-phase winding terminal Jw (the drive signals Wp and Wn). Specifically, upon output of the high level signal from any of the three OR gates 24, the failure indicative signal output circuit 25 outputs the failure indicative signal to the commutation control circuit 7. The commutation control circuit 7 holds all the drive signals Up to Wn at the low level to prohibit all the switching elements 3p to 5n from being turned on.

The operations of the comparator 20 and the latch circuit 21p are substantially the same as those in the first embodiments.

Specifically, taking as an example the comparator 20 and the latch circuit 21p provided for the U-phase winding terminal Ju, they work to determine whether the voltage Vu appearing at the U-phase winding terminal Ju is lower than the reference voltage Vref or not each time the PWM signal is at the high level. If it is determined that the voltage Vu is lower than the reference voltage Vref, the latch circuit 21p outputs the high level signal from the Q output terminal. The comparator 20 and the latch circuit 21p also determine whether the voltage Vu appearing at the U-phase winding terminal Ju is higher than the reference voltage Vref or not each time the PWM signal is at the high level. If it is determined that the voltage Vu is higher than the reference voltage Vref, the latch circuit 21p outputs the high level signal from the QB inverting output terminal.

If the latch circuit 21p is outputting the high level signal from the Q output terminal at a time when the drive signal Up from the commutation control circuit 7 changes from low to high level, that is, if it is determined that the voltage Vu appearing at the U-phase winding terminal Ju is lower than the reference voltage Vref, the AND gate 23p outputs the high level signal through the OR gate 24 to the failure indicative signal output circuit 25. This causes, as described above, all the drive signals Up to Wn to be kept at low level to prohibit all the switching elements 3p to 5n from being turned on.

Therefore, if the U-phase negative switching element 3n is short-circuited in a period of time from the beginning of the off-time K2, as shown in FIG. 2, to the end of the off-time K3, that is, from when the U-phase switching element 3p is turned on to when it is turned on again in the next cycle, the latch circuit 21p outputs the high level signal from the Q output terminal at the instant when the drive signal Up provided for the switching element 3p changes to the high level after the off-time K3. The AND gate 23p then outputs the high level signal indicative of the short circuit of the switching element 3n, thereby prohibiting, as described above, all the switching elements 3p to 5n from being turned on.

Similarly, if the latch circuit 21p is outputting the high level signal from the QB output terminal at a time when the drive signal Un from the commutation control circuit 7 changes from low to high level, that is, if it is determined that the voltage Vu appearing at the U-phase winding terminal Ju is higher than the reference voltage Vref, the AND gate 23n outputs the high level signal through the OR gate 24 to the failure indicative signal output circuit 25 to keep all the drive signals Up to Wn at the low level, thereby prohibiting all the switching elements 3p to 5n from being turned on.

Therefore, if the U-phase positive switching element 3p is short-circuited in a period of time from the beginning of the off-time K1, as shown in FIG. 2, to the end of the off-time K2, that is, from when the U-phase switching element 3n is turned on to when it is turned on again in the next cycle, the latch circuit 21p outputs the high level signal from the QB inverting output terminal at the instant when the drive signal Un provided for the switching element 3n changes to the high level after the off-time K2. The AND gate 23n then outputs the high level signal indicative of the short circuit of the switching element 3p, thereby prohibiting, as described above, all the switching elements 3p to 5n from being turned on.

Specifically, the motor control apparatus of the second embodiment is designed to monitor the voltage appearing at any one of the winding terminals Ju, Jv, and Jw of the motor 1 each time the PWM signal is at the high level using the comparator 20, the latch circuit 21p, and AND gate 23p and check the voltage monitored when one of the positive switching elements 3p, 4p, and 5p provided for the one of the winding terminals Ju, Jv, and Jw changes to the active level (i.e., the high level), that is, the logical level of a signal outputted from the Q output terminal of the latch circuit 21p to determine whether a failure has occurred in the one of the positive switching elements 3p, 4p, and 5p or not.

The motor control apparatus of the second embodiment also monitors the voltage appearing at any one of the winding terminals Ju, Jv, and Jw of the motor 1 each time the PWM signal is at the high level using the comparator 20, the latch circuit 21p, and AND gate 23n and checks the voltage monitored when one of the negative switching elements 3n, 4n, and 5n provided for the one of the winding terminals Ju, Jv, and Jw changes to the active level (i.e., the high level), that is, the logical level of a signal outputted from the Q inverting output terminal of the latch circuit 21p to determine whether a failure has occurred in the one of the negative switching elements 3n, 4n, and 5n or not.

If a failure of any one of the switching elements 3p to 5n is detected, all the switching elements 3p to 5n are prohibited from being turned on, thereby avoiding increasing of the damage.

It is also possible for the motor control apparatus to detect an open circuit of the switching elements. If the U-phase positive switching element 3p is open-circuited, it will cause the voltage Vu at the U-Phase winding terminal Ju not to be increased above the reference voltage Vref when the PWM signal is at the high level even when the drive signal Up is at the high level. The latch circuit 21p, thus, outputs the high level signal from the Q output terminal, so that the AND gate 23p outputs the high level signal, thereby prohibiting all the switching elements 3p to 5n from being turned on.

Conversely, if the U-phase negative switching element 3n is open-circuited, it will cause the voltage Vu at the U-Phase winding terminal Ju not to be decreased below the reference voltage Vref when the PWM signal is at the high level even when the drive signal Un is at the high level. The latch circuit 21p, thus, outputs the high level signal from the QB inverting output terminal, so that the AND gate 23n outputs the high level signal, thereby prohibiting all the switching elements 3p to 5n from being turned on.

Instead of the function of changing all the drive signals Up to Wn to low level through the commutation control circuit 7 to prohibit all the switching elements 3p to 5n from being turned on upon output of the failure indicative signal from the failure indicative signal output circuit 25, a logical circuit may be used which holds the gates of the switching elements 3p to 5n at low level upon output of the failure indicative signal from the failure indicative signal output circuit 25 regardless of the drive signals Up to Wp outputted from the commutation control circuit 7. Such a logical circuit may be implemented by an AND gate by designing the failure indicative signal output circuit 25 so as to output the low level signal as the failure indicative signal.

A warning lamp may be used which is turned on in response to the failure indicative signal outputted from the failure indicative signal output circuit 25 and/or outputs a warning signal or sound.

The drive signal Up may be inputted from the commutation control circuit 7 directly to the gate of the positive switching element 3p, and the output of the AND gate 13 may be inputted directly to the gate of the negative switching element 3n. This eliminates the need for the AND gates 22p and 22n.

Figure 4:
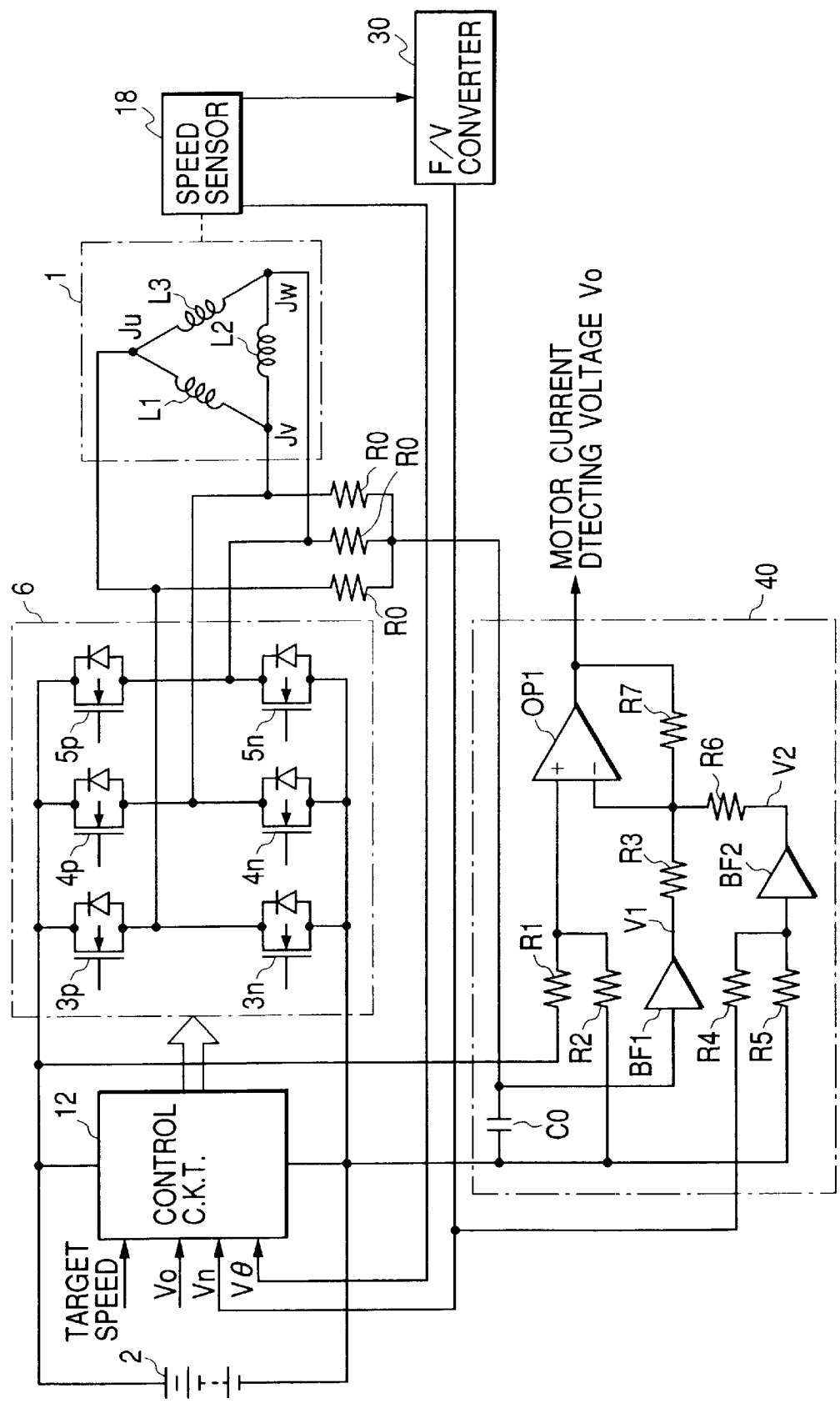
FIG. 4 is a block diagram which shows a motor current detecting apparatus according to the third embodiment of the invention.

FIG. 4 shows a motor control apparatus according to the third embodiment of the invention which may be employed in controlling the speed of a dc brushless motor for a blower of an automotive air conditioner used in regulating the quantity of air blowing in a passenger compartment and which is designed to measure the current flowing through the motor for monitoring a failure in the motor such as a short circuit or an open circuit. The same reference numbers and symbols as used in the first and second embodiments refer to the same parts, and explanation thereof in detail will be omitted here.

The motor control apparatus includes generally a speed sensor 18, an F/V converter 30, and a control circuit 12 controlling rotation of the motor 1 that is a dc brushless motor consisting of a rotor with permanent magnets and a rotor around which delta-connected armature windings L1, L2, and L3 are wound which will also be referred to below as U-, W-, and W-phase windings, respectively.

The speed sensor 18 produces an angular signal Vθ in synchronism with rotation of the motor 1 through a given angle. The F/V converter 30 converts the frequency of the angular signal V θ into a voltage signal and outputs it as a speed signal Vn indicative of the speed of the motor 1. The angular signal Vθ and the speed signal Vn are inputted to the control circuit 12 together with a target speed signal outputted from an external device (not shown).

The control circuit 12 is responsive to the angular signal Vθ indicative of an angular position of the motor 1 to switch a current flow among the U-, V-, and W-phase windings L1, L2, and L3 and controls the quantity of current to be supplied to the U-, V-, and W-phase windings L1, L2, and L3 to bring an actual speed of the motor 1 indicated by the speed signal Vn into agreement with the target one. Specifically, the control circuit 12 controls on/off operations of the switching elements 3p to 5n. For example, when it is required to energize the W-phase winding L3, the control circuit 12 turns on the positive switching element 3p connected to one end of the W-phase winding L3 and turns on and off the negative switching element 5n connected to the other end of the W-phase winding L3 using the PWM signal whose pulse width is modulated as a function of the quantity of current to be supplied to the W-phase winding L3, thereby controlling the quantity of current flowing through the W-phase winding L3.

The motor control apparatus of this embodiment also includes three resistors R0 and a current detecting circuit 40.

The resistors R0 work to measure the neutral voltage V1 of the motor 1. Specifically, the motor 1 is, as described above, the dc three-phase brushless motor consisting of the three windings L1, L2, and L3 which are delta-connected and, thus, does not have a neutral point physically which usually exists in Y-connected windings. The motor control apparatus of this embodiment, therefore, uses the three resistors R0 which have the same resistance value and which connect at one end with the U-phase winding terminal Ju, the V-phase winding terminal Jv, and the W-phase winding terminal Jw, respectively, and at the other end with each other in order to make a virtual neutral point of the motor 1 and measures the voltage appearing at a junction of the resistors R0 as the neutral voltage V1.

The current detecting circuit 40 is designed to produce the voltage Vo as a function of the current flowing through the motor 1 according to Eq. (1) below.

$$Vo = VB - V1 - V2 \qquad (1)$$

where VB is the voltage of the power supply 2 and V2 is the voltage which is proportional to the speed of the motor 1 and given by Eq. (2) below.

$$V2 = A \cdot N \qquad (2)$$

where A is a constant of proportion which is given by the relation of $A = k \cdot \phi/2$ where k is a constant of electromotive force and $\phi$ is the magnetic flux over the armature winding of the motor 1, and N is the speed of the motor 1 measured by the speed sensor 18.

The behavior of typical dc motors may be expressed by Eq. (3) below.

$$VM = k \cdot \phi N + Ia \cdot Ra \qquad (3)$$

where VM is the voltage applied to the motor, k is the electromotive force, $\phi$ is the magnetic flux over an armature winding of the motor, N is the speed of the motor, Ia is the current flowing through the armature winding, and Ra is a total resistance of a motor drive system including the armature winding.

Usually, in a three-phase brushless motor, the voltage is applied to each winding through an inverter. It is, thus, impossible to measure the voltage VM applied to the motor directly. However, if the neutral voltage of the three-phase brushless motor is defined as the above described voltage V1, the voltage VM applied to the motor may be expressed by Eq. (4) below.

$$VM = 2(VB - V1) \qquad (4)$$

By substituting Eq. (4) into Eq. (3) to express the motor current Ia using the power supply voltage VB and the neutral voltage V1, we obtain $$Ia = (VB - V1 - k \cdot \phi N/2) \qquad (5)$$

The three-phase dc motor has usually permanent magnets disposed on a rotor, so that the magnetic flux exerted on the stator from the rotor is constant. The electromotive force k is also constant. Therefore, Eq. (5) may be rewritten by Eq. (6) below.

$$\begin{aligned} Ia &= (VB - V1 - A \cdot N) \cdot 2/Ra \\ &= (VB - V1 - V2) \cdot 2/Ra \\ &= Vo \cdot 2/Ra \end{aligned} \qquad (6)$$

It is, thus, found that the voltage Vo determined by Eq. (1) is proportional to the motor current Ia, that is, that it is possible to know the motor current Ia by determining the voltage Vo.

The current detecting circuit 40 includes an operational amplifier OP1 which is connected at a non-inverting input (+) thereof to the positive terminal (i.e., the higher voltage side) of the dc power supply 2 through a resistor R1 and to the negative terminal (i.e., the lower voltage side) of the dc power supply 2 (i.e., ground) through a resistor R2. The voltage appearing at the non-inverting input is, thus, a fraction of the power source voltage VB supplied to the switching circuit 6 which is given by the equation of VB·R2/(R1+R2).

The operational amplifier OP1 is also connected at an inverting input (−) thereof to an output terminal of a buffer BF1 through a resistor R3, to an output terminal of a buffer BF2 through a resistor R6, and to an output terminal of the operational amplifier OP1 through a resistor R7.

The buffer BF1 is connected at an input terminal to the junction of the resistors R0 to store the neutral voltage V1 developed thereat.

A capacitor C0 is disposed between a line extending from the junction of the resistor R0 to the buffer BF1 and the negative terminal of the dc power supply 2 to absorb a variation in voltage at the virtual neutral point for inputting the stable neutral voltage V1 to the operational amplifier OP1.

The buffer BF2 is connected at an input terminal thereof to the negative terminal of the dc power supply 2 through a resistor R5 and to an output terminal of the F/V converter 30 through a resistor R4 and stores the speed proportional voltage V2 outputted from the resistors R4 and R5. The resistors R4 and R5 work to provide a fraction of the speed signal Vn outputted from the F/V converter 30 given by the equation of R5/(R4+R4) to produce the speed proportional voltage V2 given by the above Eq. (2).

Specifically, the F/V converter 10 converts the frequency of a signal outputted from the speed sensor 18 in synchronism with rotation of the motor 1 into the voltage to produce the speed signal Vn. The speed signal Vn is, thus, proportional to the speed N of the motor 1. If a constant of proportion of the speed signal Vn to the speed N is defined as a (i.e., Vn=a·N), the speed proportional voltage V2 may be expressed, as shown below, using the speed signal Vn in the above Eq. (1).

$$V2 = A \cdot N = (k \cdot \phi / 2) \cdot (Vn/a) = Vn \cdot R5/(R4+R5)$$

Therefore, the values of the resistors R4 and R5 may be determined as follows:

$$R5/(R4+R5) = (k \cdot \phi)/(2 \cdot a) \quad (7)$$

Specifically, this embodiment determines the values of the resistors R4 and R5 so as to meet Eq. (7), thereby setting the voltage inputted to the operational amplifier OP1 through the buffer BF2 to the speed proportional voltage V2 as defined by Eq. (2).

Of the resistors R1, R2, R3, R6, and R7 connected to the operational amplifier OP1, the values of the resistors R1 and R2 coupled to the non-inverting input (+) of the operational amplifier OP1 are so determined as to meet the relation of R2=R1/2, and the values of the other resistors R3, R6, and R7 are all set equal to the resistor R1 (i.e., R1=R3=R6=R7).

Thus, the operational amplifier OP1 produces the voltage output Vo, as can be seen from the following equation, defined by Eq. (1).

$$\begin{aligned} Vo &= VB \cdot R2/(R1+R2) + \\ &\quad VB \cdot R2/(R1+R2) - V1 + \\ &\quad VB \cdot R2/(R1+R2) - V2 \\ &= 3 \cdot VB \cdot R2/(R1+R2) - V1 - V2 \\ &= VB - V1 - V2 \end{aligned}$$

The voltage signal Vo is inputted from the operational amplifier OP1 to the control circuit 12. The control circuit 12 uses the voltage signal Vo to monitor the excess current flowing through the motor 1, while controlling the speed of the motor 1 so as to agree with the target one.

Figure 5:
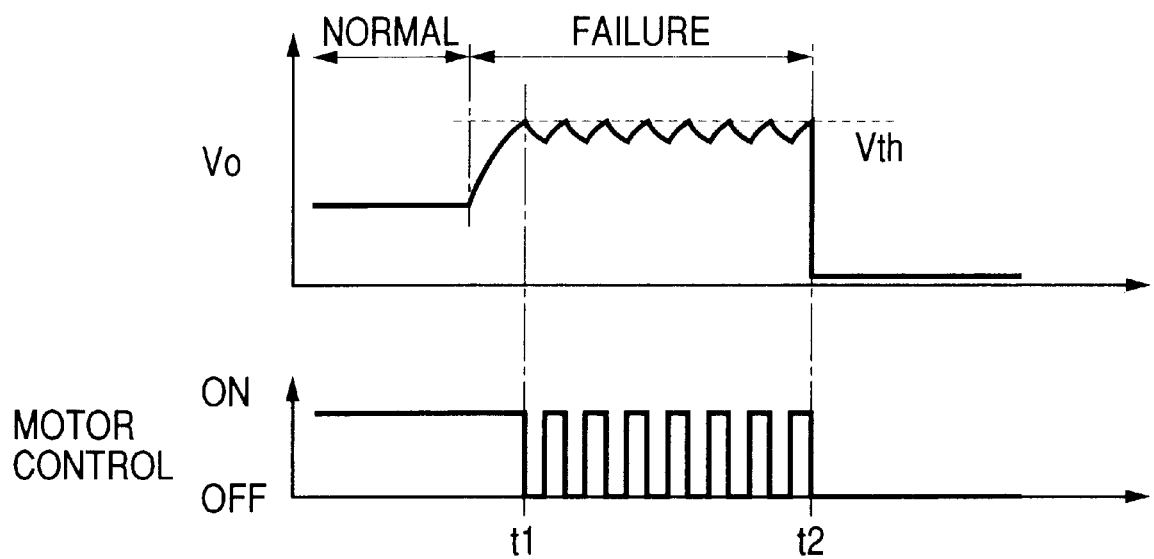
FIG. 5 is a time chart which shows a relation between voltage Vo indicating the current flowing through a motor and an operation of the motor.

The function of protecting the motor 1 and the switching circuit 6 against the excess current performed by the control circuit 12 will be described below with reference to FIG. 5.

If some failure occurs in the motor 1, increasing the motor current, it will cause the voltage signal Vo outputted from the operational amplifier OP1 to rise. The control circuit 12 determines whether the voltage signal Vo has exceeded an overcurrent threshold voltage Vth or not during motor speed control. If it is determined at time t1 that the voltage signal Vo is greater than the overcurrent threshold voltage Vth meaning that the excess current is flowing through the motor 1, then the control circuit 12 suspends the motor speed control and, after a lapse of a preselected time, resumes the motor speed control. This is because the motor 1 may return to the normal operating condition if the motor 1 is set active after a short period of time. However, if the excess current is still flowing through the motor 1 after the motor speed control is resumed, the control circuit 12 determines that the voltage signal Vo is still greater than the overcurrent threshold value Vth and suspends the motor speed control again for the preselected time.

If the number of times the motor speed control is suspended for the preselected time reaches a given number at time t2, the control circuit 12 determines that the motor 1 has failed completely and stops the motor 1. The control circuit 12 may inform an operator of such a failure using a warning lamp or buzzer, for example.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

For example, the on/off operation of each of the negative switching elements $3n$, $4n$, and $5n$ using a logical product of the drive signal from the commutation control circuit 7 and the PWM signal produced by the AND gate may alternatively be achieved using comparators.

The above embodiments are designed to PWM control only a series of the negative switching elements $3n$, $4n$, and $5n$ using the PWM signals, but may be designed to PWM control either or both of series of the negative switching elements $3n$, $4n$, and $5n$ and the positive switching elements $3p$, $4p$, and $5p$.

The PWM signal generator 9 may have a known structure consisting of a triangle wave generator generating a triangular wave of, for example, 20 kHz and a threshold determining circuit determining a threshold value to be compared with the triangular wave as a function of a motor speed control signal indicating the speed of the motor 1. The PWM signal generator 9 outputs the high level signal when the triangular wave is greater in level than the threshold value and outputs the low level signal when the triangular wave is smaller in level than the threshold value to produce the PWM signal having a duty factor as a function of the motor speed control signal. In this case, instead of the latch circuits $21p$ and $2n$, a signal processing circuit may be provided which latches the output of the comparator 20 each time the triangular wave outputted from the triangle wave generator reaches a peak of a maximum level to output the latched signal and a signal reverse in level to the latched signal. Specifically, the signal processing circuit latches the output of the comparator 20 at the center of a time period during which the PWM signal is at the high level and outputs it to the AND gates $22p$, $22n$, $23p$, and $23n$, thereby realizing substantially the same operations as those in the above embodiments.

The signal processing circuit may alternatively be designed to change the output thereof only when it latches the output of the comparator 20 four times in sequence, for example, thereby adding filtering effects of minimizing noises.

What is claimed is:

1. An apparatus for detecting a motor current flowing through delta-connected armature windings of a three-phase brushless dc motor when the motor is operated through a motor driver, comprising:

a neutral voltage detecting circuit including three resistors which are connected at one end to the armature windings of the motor, respectively, and at the other end to a common junction, said neutral voltage detecting circuit measuring a voltage developed at the common junction as a neutral voltage V1 of the motor;

a speed proportional voltage generator generating a voltage V2 proportional to a speed N of the motor according to an equation (1) below; and $$V2 = A \cdot N \quad (1)$$

where A is a constant of proportion which is given by a relation of A =k·φ/2 where k is a constant of electromotive force and φ is magnetic flux over one of the armature windings a current determining circuit determining a voltage Vo according to an equation (2) below which indicates the motor current flowing through the motor $$Vo = VB - V1 - V2 \qquad (2)$$

where VB is a voltage supplied to the motor driver to operate the motor.

2. An apparatus as set forth in claim 1, further comprising an operation suspending circuit which suspends the operation of the motor for a preselected period of time when the voltage Vo exceeds a given threshold value.

3. An apparatus as set forth in claim 2, wherein said operation suspending circuit stops the operation of the motor completely when the number of times the operation of the motor is suspended reaches a preselected number.

* * * * *

UNITED STATES PATENT AND TRADEMARK OFFICE
CERTIFICATE OF CORRECTION

PATENT NO.    : 6,469,461 B1
DATED         : October 22, 2002
INVENTOR(S)   : Shinichi Konda It is certified that error appears in the above-identified patent and that said Letters Patent is hereby corrected as shown below:

<u>Title page,</u>
Item [75], Inventors, correct the inventors of the patent to delete "Susumu Ueda, Okazaki (JP)"

Signed and Sealed this

Ninth Day of September, 2003

JAMES E. ROGAN
*Director of the United States Patent and Trademark Office*